United States Patent [19]
Ives

[11] Patent Number: 4,846,091
[45] Date of Patent: Jul. 11, 1989

[54] LINEAR PROPELLER

[76] Inventor: Christopher Ives, 89 Shepherd Cir., Hudson, Quebec, Canada

[21] Appl. No.: 900,842

[22] Filed: Aug. 27, 1986

[30] Foreign Application Priority Data

Dec. 17, 1985 [CA] Canada ................................. 497905

[51] Int. Cl.⁴ ............................................. B63H 1/34
[52] U.S. Cl. ............................... 114/270; 305/35 EB; 416/7; 440/95
[58] Field of Search ............... 114/270; 440/95 X, 96, 440/98, 100, 90, 49; 305/35 EB, 35 R; 416/78; 415/5; 417/320; 210/242.1, 242.3, 923; 152/209 D

[56] References Cited

U.S. PATENT DOCUMENTS

| | | | |
|---|---|---|---|
| D. 67,669 | 6/1925 | Merriman | 152/209 D |
| 1,487,340 | 3/1924 | Kroupsky | 305/35 EB |
| 2,138,207 | 11/1938 | Roebling | 114/270 |
| 2,404,486 | 7/1946 | Hait | 114/270 |
| 2,586,218 | 2/1952 | Gazda | 115/1 |
| 3,077,173 | 2/1963 | Lang | 440/49 X |
| 3,155,436 | 11/1964 | Bonmartini | 305/13 |
| 3,180,305 | 4/1965 | Gower-Rempel | 114/270 |
| 3,620,184 | 11/1971 | Thousand | 114/270 |
| 3,664,446 | 5/1972 | Burtis et al. | 180/5 R |
| 3,758,170 | 9/1973 | Mazurek | 305/35 |
| 3,917,360 | 11/1975 | Gregoire | 305/30 |
| 3,934,944 | 1/1976 | Forsgren | 305/38 |
| 4,264,444 | 4/1981 | Bronnec | 210/242.3 |

FOREIGN PATENT DOCUMENTS

| | | |
|---|---|---|
| 1945520 | 3/1971 | Fed. Rep. of Germany .......... 416/7 |
| 2707504 | 8/1978 | Fed. Rep. of Germany ... 152/209 D |
| 3329196 | 2/1985 | Fed. Rep. of Germany ...... 210/923 |

OTHER PUBLICATIONS

Publication: W. M. Beardsley, "Surface Impulse Propulsion: A Review and Comment on Future Potential", *Hovering Craft & Hydrofoil*, 1977, p. 10.

*Primary Examiner*—Sherman D. Basinger
*Attorney, Agent, or Firm*—Hayes, Soloway, Hennessey & Hage

[57] ABSTRACT

The invention relates to a linear propeller device capable of use for propulsion of amphibious vehicles or for liquid pumping, the device having an endless outer surface having a substantially uniform width and being arranged to be movable along a predetermined path substantially perpendicular to the width, at least one row of spaced blades extending along the length of the outer surface and projecting outwardly therefrom, and each blade being disposed at a predetermined acute angle to the path, whereby, upon movement of the outer surface along the path with a portion of the row of blades submerged in a liquid, the blades induce relatively undisturbed flow of the liquid from one side of the blades to the other side of blades through the spaces between the blades and thereby produce thrust for propelling a craft in water or pumping liquids.

6 Claims, 18 Drawing Sheets

LINEAR PROPELLER

The present invention generally relates to a linear propeller device.

BACKGROUND OF THE INVENTION

Amphibious hovercraft usually employ ducted air propellors for forward motion and directional control over land, water, snow and ice. Low speed thrust and lack of control in cross winds or when climbing or descending steep slopes are problems which have plagued the industry. Air propellor performance, in terms of thrust, efficiency and noise level, and installation, in terms of drivetrain, mounting, and freeboard, have presented serious constraints to hovercraft performance and fuel economy.

Hybrid amphibious vehicles utilizing an alternative form of propulsion, paddletrack propulsion, were extensively used during the second world war but were found to provide inadequate thrust and efficiency at speed over water. Hydrodynamic design considerations were over-ridden by the need for closely spaced cleats to ensure adequate ground tractive effort and support. These deficiencies are an inherent flaw in the propulsion principle as explained hereinbelow.

Paddletrack propulsion is one of the oldest forms of mechanical drive. In modern applications, the paddles, which extend at 90° to the direction of travel, are mounted on endless movable tracks, similar to the treads or cleats of conventional tracked vehicles. About one third of the tracks act upon the water simultaneously.

In order to obtain a reasonable degree of efficiency in water with a propulsion system of this type, it is essential that undisturbed water be fed constantly into the spaces between the cleats if a high degree of frictional resistance or tractive effort between the water and the cleats is to be produced. While this can be achieved by providing relatively wide inter-cleat spacing, the resultant track does not present sufficient blade area to "bite" the water since only stub blades are practical for amphibious vehicles. High or deep blades would quickly become damaged on ground and also present extreme bending moments on the blade mounting to the belt or track. Thus, the track would be rendered incapable of adequately supporting the vehicle on land. Conversely, narrow inter-cleat spacing would cause the cleats to churn through the water which would greatly disturb the water between the cleats and result in an inefficient propulsion system.

The present invention was developed in an attempt to overcome the disadvantages of both types of propulsion arrangements discussed above. For reasons which will become clear later, the invention is considered inherently useful in a variety of other applications such as, for example, oil pollution cleanup, firepump suction in shallow water, ice prevention and removal, bolt-on thrusters for ship recovery, jetty (safety) thruster devices, material dewatering conveyors, underwater dredging, trenching and mining and crawler propulsion pads. Thus, the present invention is not to be regarded as being limited to vehicle propulsion systems.

SUMMARY OF THE INVENTION

In general terms, the present invention relates to a linear propeller device, comprising body means defining an endless outer surface having a substantially uniform width and being arranged to be movable along a predetermined path substantially perpendicular to the width, at least one row of spaced blades extending along the length of the outer surface and projecting outwardly therefrom, and each blade being disposed at a predetermined acute angle to the path. Thus, upon movement of the outer surface along the path with a portion of the row of blades submerged in a liquid, the blades induce relatively undisturbed flow of the liquid from one side of the blades to the other side of blades through the spaces between the blades.

In more specific terms, the body means takes the form of an endless flexible belt which may assume a snowmobile belt or hinged track configuration in some applications and a cylindrical or tire configuration in other applications. When the underside blades of the belt are submerged and the belt is rotated such that the laterally inner edge portion, the leading edge, of the submerged blades lead the laterally outer portion, the trailing edge, there results a relatively quiet inflow of water longitudinally and centrally of the belt into the space between the rows, then into the space between the blades and an outflow of water laterally outwardly of the interblade spaces. This arrangement can be used as a propulsion system for amphibious vehicles, as well as a propulsion system for watercraft, because the spacing between the blades need not be as wide as is required in conventional paddletrack design. This propulsion arrangement is capable of performing at supercavitating speeds while also capable of providing positive traction and control for high speed amphibious vehicles.

The device acts as a boundary layer pump (high flow at low head) if rotated in the opposite or reverse direction and is also suitable in either configuration for either deep or shallow water operation, such as, for example, barge or tug propulsion and as a side thruster for ship manoevering and stationkeeping. Other applications include oil pollution cleanup, firepump suction in shallow water, and ice prevention and removal.

Although the present invention is best suited for belts or tracks, because of their capability of having a relatively large number of their blades submerged simultaneously, it can also be applied to wheels or tires so as to provide propulsion for buoyant offroad vehicles. Thus, unless otherwise indicated, the terms "belt" or "track" are to be construed as including wheels and tires.

BRIEF DESCRIPTION OF THE DRAWINGS:

These and other features of the invention will become more apparent from the following description in which referece is made to the appended drawings, wherein.

DETAILED DESCRIPTION OF THE INVENTION

Figure 1:
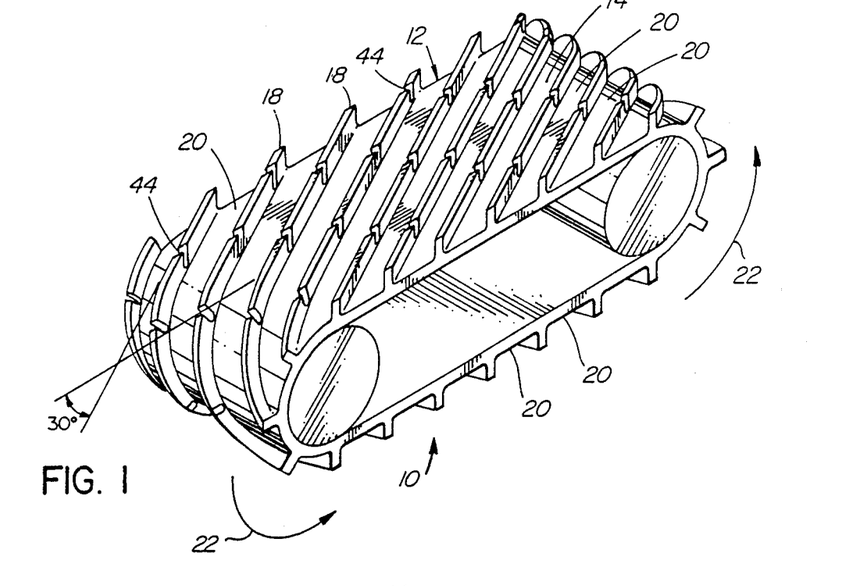
FIG. 1 is a perspective view of one embodiment of a linear propeller drive belt constructed in accordance with the present invention.
Figure 2:
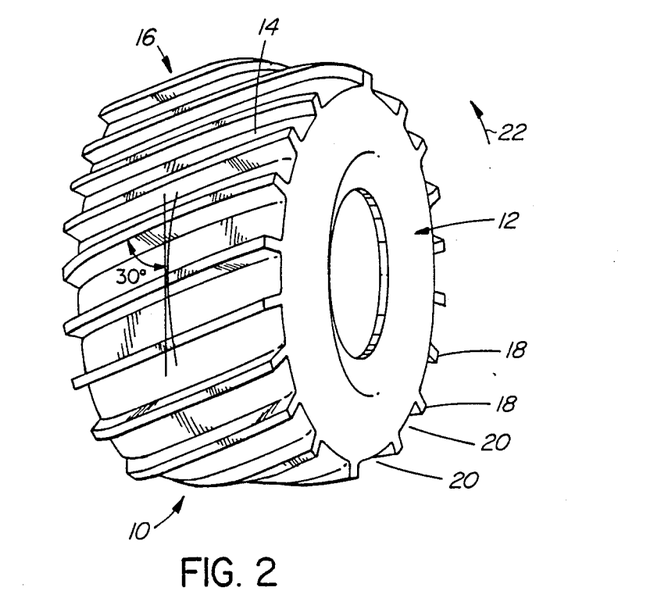
FIG. 2 is a perspective view of another embodiment of a linear propeller drive belt constructed in accordance with the present invention.
Figure 3:
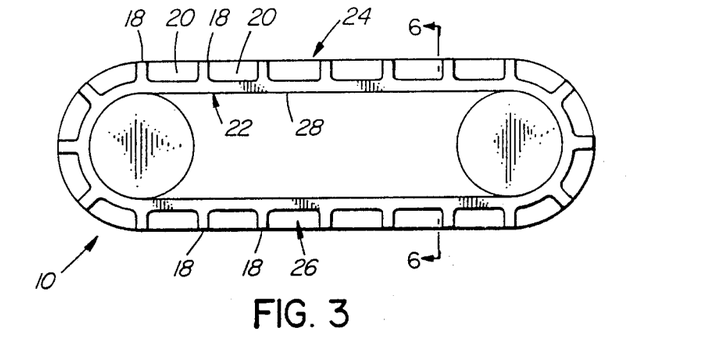
FIG. 3 is a side elevational view of the linear propeller drive belt illustrated in FIG. 1.

FIGS. 1 and 2 diagrammatically illustrate two embodiments of the linear propeller device, generally designated by reference numeral 10, of the present invention comprising an endless body 12 having an outer surface 14 and at least one row 16 of outwardly projecting blades 18 on the outer surface. The blades are equally spaced from one another to define interblade spaces 20 and are disposed at a predetermined angle to the direction of motion of the body when driven in a circuitous path indicated by arrow 22.

The shape or configuration of body 12 depends upon the application to which the linear propeller is subjected. When used as a propeller for vehicles primarily intended for use in water with excursions onto land such as watercraft, amphibious vehicles, including hovercraft and the like and for vehicles of the snowmobile type, the body may assume an oblong shape as shown in FIG. 1 and be of unitary flexible construction or of articulated or pivoted (transverse to the direction of motion of the body) multi-sectional construction. For vehicles primarily intended for use on land with excursions into water, the body may assume a cylindrical shape, as in a tire or wheel, as shown in FIG. 2, or any other suitable configuration. The latter may be rigid or flexible as will become clear later.

The important characteristic of the blades is that, when at least the lower portion or run of the body is submerged in a liquid and the body is rotated, the row of blades induce a generally undisturbed, laminar flow of liquid from one side of the row of blades to the other side through the interblade spaces in such a manner as to generate a thrust which can be used to propel a craft or the fluid. This characteristic is achieved when there is proved at least one row of blades in which the blades are disposed at an angle to the direction of movement of the belt. When the belt is provided with one or more mirror image, symmetrically disposed pairs of blades, a balanced thrust is produced.

Reference will now be made to FIGS. 3 to 8 in which the body is in the form of an endless belt 22 having an upper run 24 movable in what will be referred to as a forward direction and a lower run 26 movable in a rearward direction. The belt includes an inner surface 28 and a pair of laterally spaced, parallel edges 30 and 32.

Figure 4:
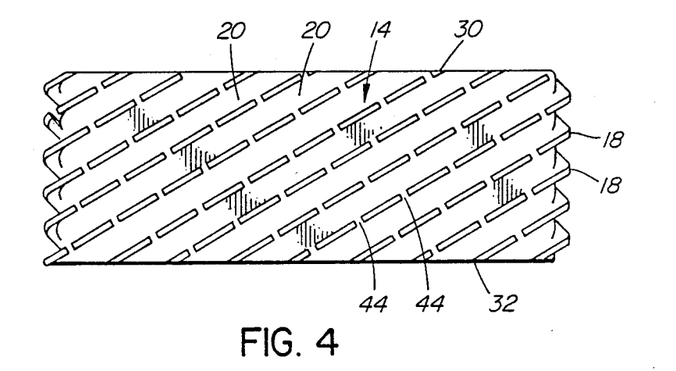
FIG. 4 is a bottom view of the linear propeller drive belt illustrated in FIG. 3.

As previously suggested, the belt may be provided with one or more rows of blades. The belt illustrated in FIGS. 1 and 4 is formed with only one row of blades which extend substantially across the entire width of the belt. A belt having this blade pattern is particularly useful, when used with a second belt having a mirror image blade pattern, as a propeller for a large craft or vehicle such as that illustrated in FIGS. 18 to 20 and discussed later.

Figure 5:
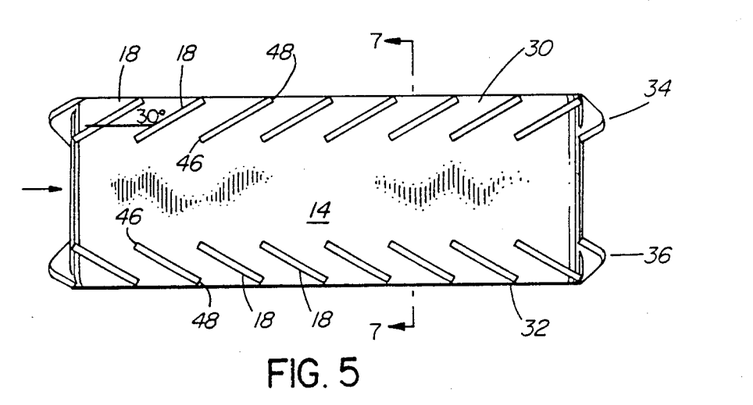
FIG. 5 is a bottom view of a linear propeller drive belt similar to that illustrated in FIG. 4 but illustrating a symmetrical blade pattern to provide balanced thrust.
Figure 6:
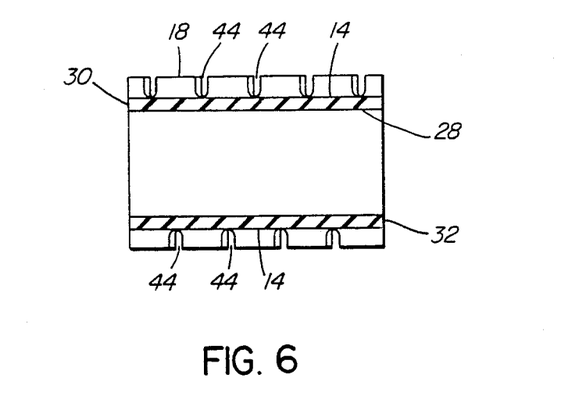
FIG. 6 is a cross-sectional view taken along line 6—6 in FIG. 3.
Figure 7:
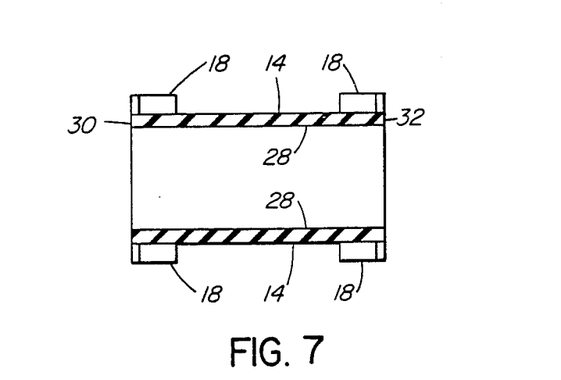
FIG. 7 is a cross-sectional view taken along line 7—7 of FIG. 5.

The belt illustated in FIG. 5 is provided with a pair of rows 34 and 36 of blades symmetrically disposed about the longitudinal central plane of the belt. A belt configured in this manner is suitable for use as a propeller for crafts of the type illustrated in FIGS. 12 to 17.

Figure 8:
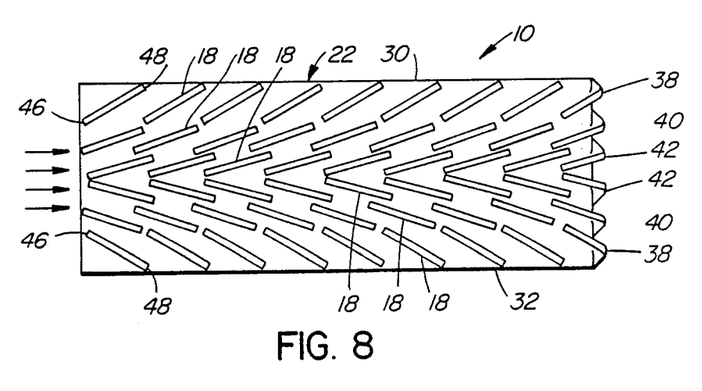
FIG. 8 is a bottom view of a linear propeller drive belt similar to that illustrated in FIG. 4 but illustrating a symmetrical blade pattern having a plurality of rows of blades for better support on land and balanced thrust in water.

The belt illustrated in FIG. 8 is provided with three mirror image pairs of rows 38, 40, and 42 of blades wherein the angle between the blades and the direction of motion of the belt of each row progressively decrease from the outside of the belt to the mid-section thereof. The transverse space between the rows may vary depending upon load supporting requirements and the like. This configuration is particularly well suited for amphibious craft in that the larger number of blades reduces the vertical load which must be carried by each blade. The change in the blade angle from row to row is to provide for a smoother transition of the fluid flow direction.

Each blade 18 projects substantially perpendicularly from the outer surface of the belt with its length, thickness and depth arranged to suit the load it is intended to support on land and the thrust it is intended to deliver in water. The blades of belts intended primarily for use on land will tend to be thick and shallow in order to minimize bending stresses at the roots of the blades whereas those intended primarily for use in water may be relatively narrow and deep.

The length of the blades depends primarily upon the configuration of the belt. Whereas the blades of a cylindrical belt, such as a tire, may be relatively long because the belt experiences relatively little change in the curvature of the belt during rotation, those of an oblong belt which are adapted to be trained about relatively small diameter pulleys or the like, experience dramatic changes in curvature from the root outward during each revolution of the belt and, thus, relatively high stresses would occur in long blades. Thus, these blades must be maintained relatively short and should not overlap one another in the transverse direction (to the direction of motion of the belt). Nevertheless, relatively long blades may be provided if the blades are formed with notches 44 appropriately spaced along their length, as shown in FIGS. 1 and 4, with the roots of the notches formed with relatively large radius fillets. It will be understood that the smaller the diameter of the pulleys about which the belt is trained, the larger the number of notches and the smaller the spacing between the notches which must be provided.

The blades are disposed at a predetermined acute angle to the direction of movement of the belt with a leading edge 46 disposed laterally inwardly of the belt in relation to a trailing edge 48. For example, the blades may be planar in configuration and disposed at an angle of 30° to the direction of travel of the belt.

Figure 9:
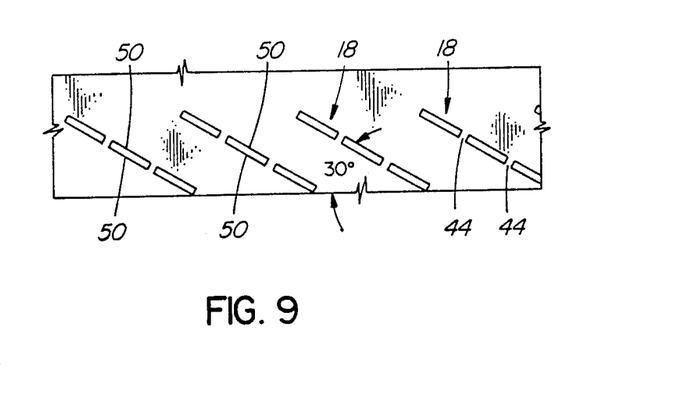
FIGS. 9, 10 and 11 illustrate three blade profiles.
Figure 10:
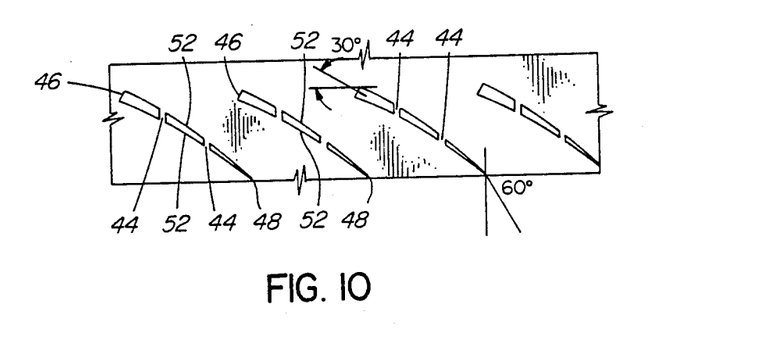
Figure 11:
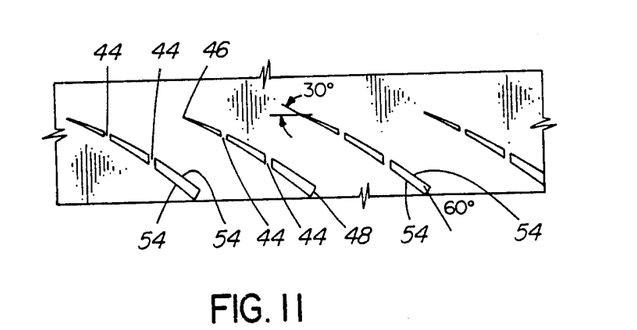

FIGS. 9, 10 and 11 illustrate three blade profiles. FIG. 9 illustates a planar blade profile having a pair of parallel planar side walls 50 disposed at an angle of about 30° to the directions of motion of the belt.

FIG. 10 illustrates an aerofoil-type or streamlined profile and having curved side walls 52, a curved leading edge 46 and a relatively sharp trailing edge 48. In this configuration, inlet angle of the blade, relative to the direction of travel of the belt, may fall in the range of 0° to 30° while the angle of the outlet end may fall in the range of 30° to 60°. The shaping or profiling of the blades in this manner serves to further reduce energy losses in that it maintains the flow of water between the blades in a relatively undisturbed condition.

FIG. 11 illustrates a supercavitating profile characterized by curved side walls 54, a relatively sharp leading edge 46 and a blunt trailing edge or surface 48 disposed at about 60° to the side walls.

The belt is mounted on the vehicle or other structure in such a manner that, when used in water, the upper run is disposed out of the water while at least the blades of the lower run are submerged. As the blades of the lower run move through the water, water is ejected laterally outwardly from the spaces between the blades, as shown in FIG. 5, thus generating a balanced, forwardly directed component of thrust. This flow of water generates a constant flow of generally undisturbed water which, relative to the belt, is seen to enter the space bounded by the rows and of blades, the plane defined by the free ends of the submerged blades and the outer surface of the belt from the rear of the belt. The water then smoothly flows into the spaces between the blades and is ejected therefrom in the manner as explained above.

Tests have shown that when the track is operated in a reverse direction, water is inducted along the edges and discharged as a jet from the back end of the track, thrust levels were about 50% lower than those for the aforedescribed mode of operation. This indicates that the latter arrangement is more suitable for pumping.

Figure 12:
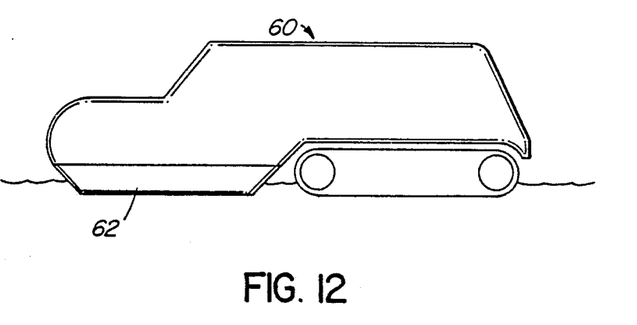
FIGS. 12-14 diagrammatically illustrate a hybrid hovercraft which utilizes a forwardly disposed hover cushion pad and two linear propeller devices at the rearward end of the craft for support, thrust and directional control for the craft.
Figure 13:
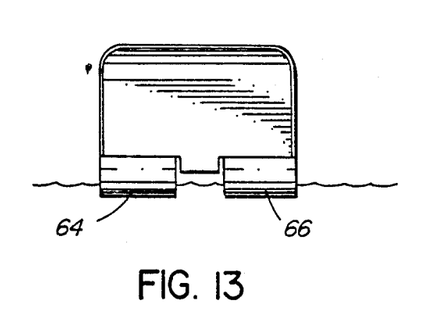
Figure 14:
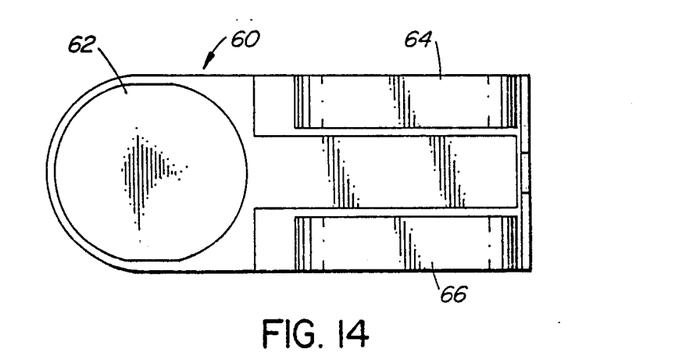

FIGS. 12-14 illustate a hybrid hovercraft 60 which utilizes a forwardly disposed hover cushion pad 62 to support the front end of the craft and two linear propeller devices 64 and 66 to support the rearward end of the craft as well as provide thrust and directional control, the latter being achieved by driving the devices at different speeds. The belts can be of the type illustrated in either of FIGS. 4, 5 and 8 and supported or driven in any suitable manner, such as, for example, the manner in which conventional paddletracks are mounted and driven with provision being made where appropriate to seal critical components. Means (not shown) may be provided for adjusting the height and/or spring rate of the suspension and active control compensation for varying terrain and for hydroplaning may be provided. The means could be arranged to tilt the front end of the linear propellers out of the water at high speeds to reduce the bite of the blades. Still further, the tracks may be arranged to be pivotal about vertical axes in order to further enhance directional control.

Figure 15:
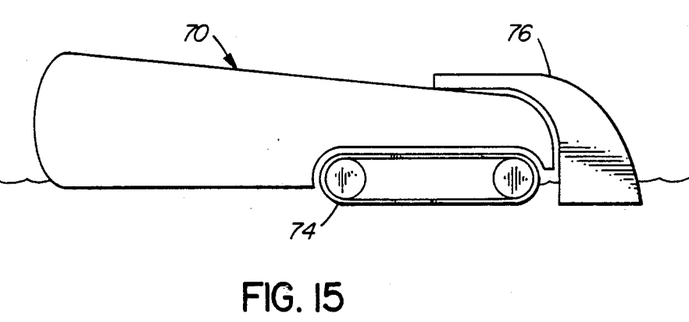
FIGS. 15-17 illustrate a configuration for a light duty water vehicle utilizing a single linear propeller track for propulsion and a rudder or guide vane for directional control.
Figure 16:
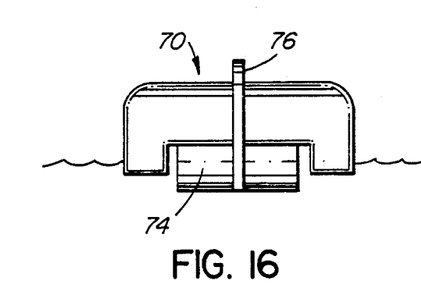
Figure 17:
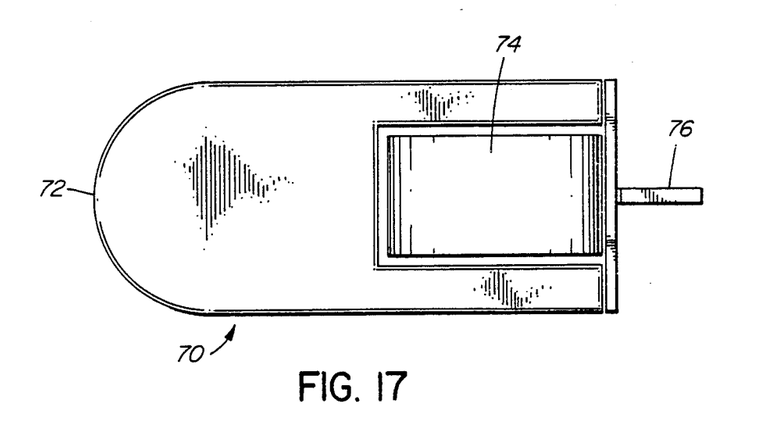

FIGS. 15-17 illustrate a configuration for a light duty water vehicle 70 including a hull 72, a single track 74 and a rudder or guide vane 76 for directional control. The track may of the type illustrated in FIGS. 5 and 8. The hull could, if desired by provided with a pair steerable, planing skis so as to enable the vehicle to be used over both water and snow.

Figure 18:
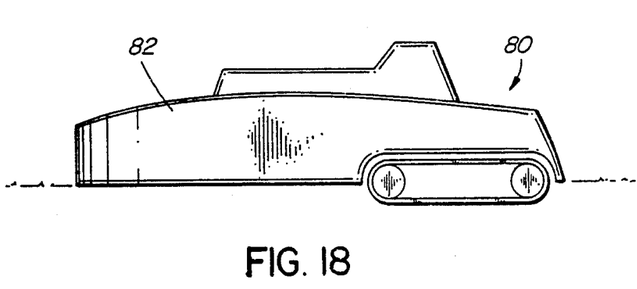
FIGS. 18-20 are views similar to FIGS. 12-14, but utilizing a pair of widely spaced apart tracks which together serve as a linear propeller.
Figure 19:
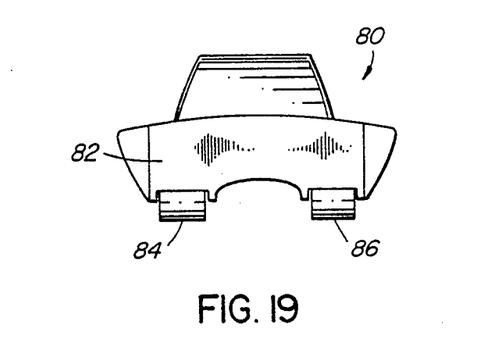
Figure 20:
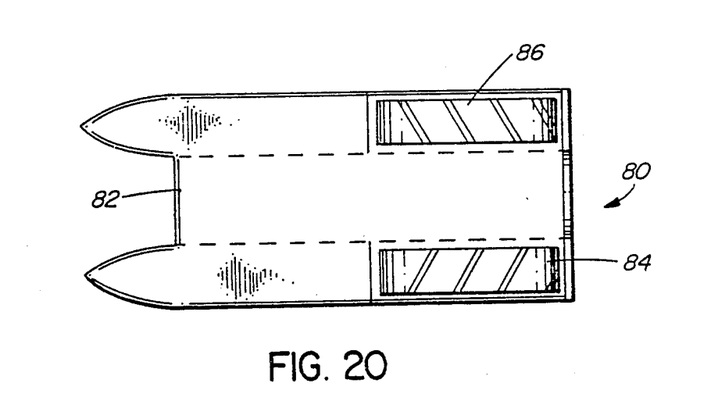

FIGS. 18-20 illustrate an arrangement for use with very large craft 80 where a belt of craft width would be impractical. Craft 80 comprises a hull 82, whose front end may be supported by a hover pad or other suitable floatation device, and whose rear end is supported by a pair laterally disposed tracks 84 and 86. Tracks 84 and 86 are of the type illustrated in FIGS. 1 and 4 which include a single row of blades extending across substantially the entire width of the track. Thus, as the blades of the lower runs of the tracks move through the water, water is ejected laterally outwardly from the spaces between the blades, as shown in FIG. 20, thus generating a forwardly directed component of thrust. The side thrusts produced are in opposite directions and thus are balanced. This flow of water generates a constant inflow of generally undisturbed water from between the tracks which, relative to the craft, is seen to enter the space between the tracks from the rear of the craft. The water then smoothly flows into the spaces between the blades and is ejected therefrom in the manner as explained above.

Recessed fluid inlet (not shown) may be provided for certain design and operating configurations. Discharge guide vanes (not shown) could also be used to vector the exit water streams downwards to avoid entrapment of entrained solids in the rear skirt of the craft, such as might occur, for example, in silty, shallow waters or when crossing sand bars.

Given the foregoing and the state of the art of paddle-track suspensions and drivetrains, it is not believed necessary to describe the latter in detail herein.

Figure 21:
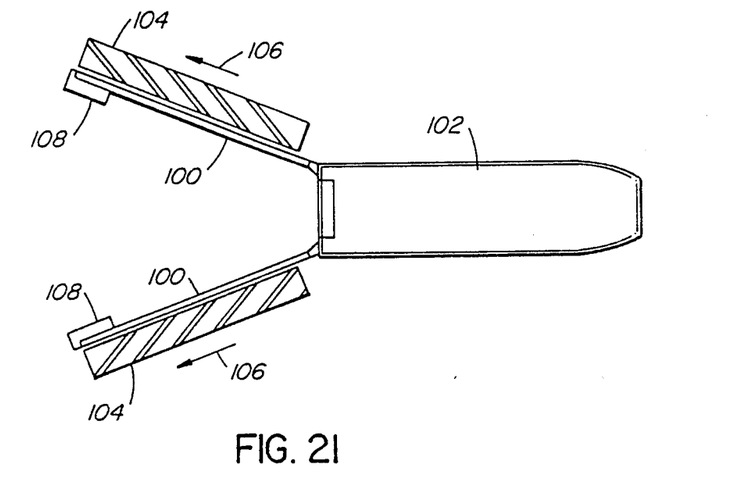
FIGS. 21 to 23 illustrate an oil pollution clean-up apparatus utilizing a fluid propeller of the present invention.
Figure 22:
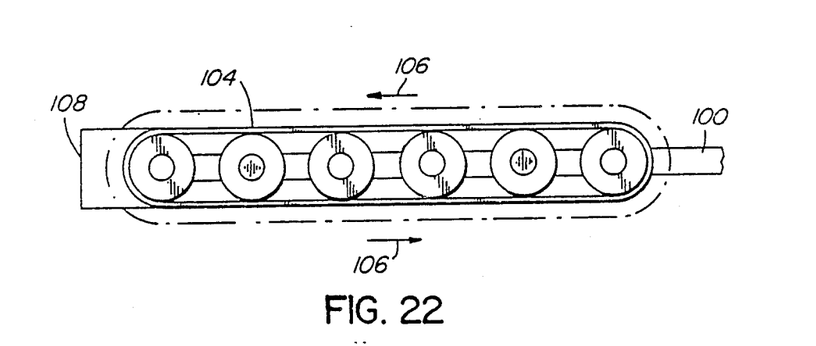

FIGS. 21-22 diagrammatically illustrate a different application of the linear fluid propeller of the present invention and, more specifically, an oil spill recovery apparatus. A pair of booms 100 are articulatedly mounted in a V-shaped arrangement at the forward end of a conventional oil spill recovery vessel 102. A linear propeller 104 having a single row of blades extending across substantially the entire width of the belt, as illustrated in FIGS. 1 and 4, is mounted on each boom. Suitable drive means (not shown) disposed in or extending through the booms, drive the belts in a direction indicated by arrows 106. The booms are provided with floatation means, such as floats generally indicated by reference numeral 108, for supporting the belts in such a manner that only the lower run of the belts are submerged. Thus, it will be seen that by propelling the belts in the direction shown, oil will be caused to flow from the outboard side of the each belt to the inboard side thereof as well as rearwardly towards the vessel on which a conventional skimmer is mounted.

Figure 23:
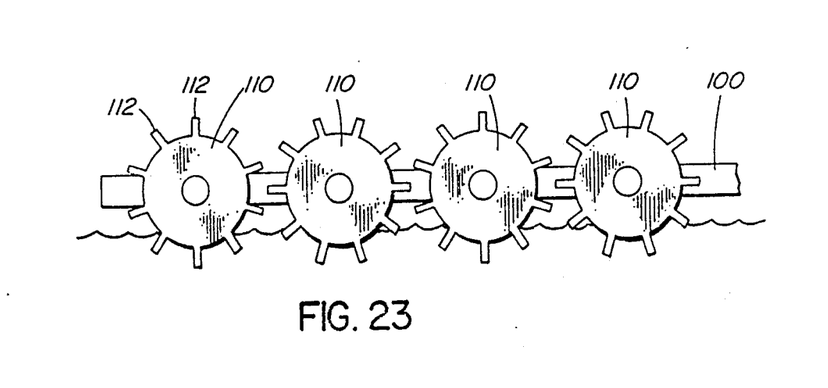

FIG. 23 illustrates an alternative arrangement wherein the belts are replaced by a plurality of rigid hollow and sealed wheels or drums 110 having a plurality of blades 112 extending across substantially the entire width of the drums at an angle to the direction of travel of the periphery of the drums. Significant advantages of this embodiment are that the drums themselves serve as the floation means, and thus the depth of the blades can be accurately controlled, and the drums at the vessel end of the booms can be driven at different speeds from those at the remote end and thus provide for more uniform feeding of oil to the skimmer.

It will be understood that various modifications and alterations may be made to the above described invention without departing from the spirit of the invention as defined in the following claims.

The embodiments of the invention in which an exclusive property or privilege is claimed are defined as follows:

1. A linear propeller adapted to be secured to a drive mechanism, comprising:
   an endless annular body, having an endless outer surface, movable along an annular path;
   at least one pair of opposed, laterally spaced, longitudinal extending, mirror image rows of equally longitudinally spaced reaction propeller blades on said outer surface;
   each said propeller blade having a blade body extending from said outer surface at about right angles thereto and having opposed side surfaces, a leading edge at one end of said blade body and a trailing edge at the other end of said blade body, said blade body being arranged such that a tangent to the central axis bisecting said opposed side surfaces of said blade body adjacent said leading edge forms a leading edge angle with respect to the direction of motion of said endless body in the range of between 0° and 30° and a tangent of said central axis of said blade body at said trailing edge forms a trailing edge angle with respect to the direction of motion of said endless body in the range of between 30° and 60°, said leading edge angle being about 0° and said trailing edge angle being about 30° and said opposed side surfaces being smoothly curved.

2. A linear propeller adapted to be secured to a drive mechanism, comprising:
   an endless annular body, having an endless outer surface, movable along an annular path;
   at least one pair of opposed, laterally spaced, longitudinal extending, mirror image rows of equally longitudinally spaced reaction propeller blades on said outer surface;
   each said propeller blade having a blade body extending from said outer surface at about right angles thereto and having opposed side surface, a leading edge at one end of said blade body and a trailing edge at the other end of said blade body, said blade body being arranged such that a tangent to the central axis bisecting said opposed side surfaces of said blade body adjacent said leading edge forms a leading edge angle with respect to the direction of motion of said endless body in the range of between 0° and 30° and a tangent of said central axis of said blade body at said trailing edge forms a trailing edge angle with respect to the direction of motion of said endless body in the range of between 30° and 60°, said leading edge angle being about 30° and said trailing edge angle being about 60° and said opposed side surfaces being smoothly curved.

3. A linear propeller adapted to be secured to a drive mechanism, comprising:
   an endless annular body, having an endless outer surface, movable along an annular path;
   at least one pair of opposed, laterally spaced, longitudinal extending, mirror image rows of equally longitudinally spaced reaction propeller blades on said outer surface;
   each said propeller blade having a blade body extending from said outer surface at about right angles thereto and having opposed side surfaces, a leading edge at one end of said blade body and a trailing edge at the other end of said blade body, said blade body being arranged such that a tangent to the central axis bisecting said opposed side surfaces of said blade body adjacent said leading edge forms a leading edge angle with respect to the direction of motion of said endless body in the range of between 0° and 30° and a tangent of said central axis of said blade body at said trailing edge forms a trailing edge angle with respect to the direction of motion of said endless body in the range of between 30° and 60°, further including a plurality of pairs of said rows of propeller blades, said leading and trailing angles progressively increasing from inner ones of said rows to outer one of said rows.

4. A linear propeller adapted to be secured to a drive mechanism of an amphibious vehicle for propelling said vehicle, said propeller comprising:
   an endless, flexible annular body, having an endless substantially smooth and uninterrupted outer surface, movable along an annular path;
   at least one pair of opposed, laterally spaced, longitudinal extending, mirror image rows of equally longitudinally spaced reaction propeller blades on said outer surface;
   each said propeller blade having a flexible blade body integral with and extending from said outer surface of said endless body at about right angles thereto and having opposed side surfaces, a leading edge at one end of said blade body and a trailing edge at the other end of said blade body, said blade body being arranged such that a tangent to the central axis bisecting said opposed side surfaces of said blade body adjacent said leading edge forms a leading edge angle with respect to the direction of motion of said endless body in the range of between 0° and 30° and a tangent of said central axis of said blade body at said trailing edge forms a trailing edge angle with respect to the direction of motion of said endless body in the range of between 30° and 60°, said leading edge angle being about 0° and said trailing edge angle being about 30° and said opposed side surfaces being smoothly curved.

5. A linear propeller adapted to be secured to a drive mechanism of an amphibious vehicle for propelling said vehicle, said propeller comprising:
   an endless, flexible annular body, having an endless substantially smooth and uninterrupted outer surface, movable along an annular path;
   at least one pair of opposed, laterally spaced, longitudinal extending, mirror image rows of equally longitudinally spaced reaction propeller blades on said outer surface;
   each said propeller blade having a flexible blade body integral with and extending from said outer surface of said endless body at about right angles thereto and having opposed side surfaces, a leading edge at one end of said blade body and a trailing edge at the other end of said blade body, said blade body being arranged such that a tangent to the central axis bisecting said opposed side surfaces of said blade body adjacent said leading edge forms a leading edge angle with respect to the direction of motion of said endless body in the range of between 0° and 30° and a tangent of said central axis of said blade body at said trailing edge forms a trailing edge angle with respect to the direction of motion of said endless body in the range of between 30° and 60°, said leading edge angle being about 30° and said trailing edge angle being about 60° and said opposed side surfaces being smoothly curved.

6. A linear propeller adapted to be secured to a drive mechanism of an amphibious vehicle for propelling said vehicle, said propeller comprising:

an endless, flexible annular body, having an endless substantially smooth and uninterrupted outer surface, movable along an annular path;

at least one pair of opposed, laterally spaced, longitudinal extending, mirror image rows of equally longitudinally spaced reaction propeller blades on said outer surface;

each said propeller blade having a flexible blade body integral with and extending from said outer surface of said endless body at about right angles thereto and having opposed side surfaces, a leading edge at one end of said blade body and a trailing edge at the other end of said blade body, said blade body being arranged such that a tangent to the central axis bisecting said opposed side surfaces of said blade body adjacent said leading edge forms a leading edge angle with respect to the direction of motion of said endless body in the range of between 0° and 30° and a tangent of said central axis of said blade body at said trailing edge forms a trailing edge angle with respect to the direction of motion of said endless body in the range of between 30° and 60°, further including a plurality of pairs of said rows of propeller blades, said leading and trailing angles progressively increasing from inner ones of said rows to outer one of said rows.

* * * * *